(12) United States Patent
Lee et al.

(10) Patent No.: US 12,103,591 B2
(45) Date of Patent: Oct. 1, 2024

(54) FRAME STRUCTURE FOR A VEHICLE

(71) Applicants: HYUNDAI MOTOR COMPANY, Seoul (KR); KIA CORPORATION, Seoul (KR)

(72) Inventors: Won Hae Lee, Seoul (KR); Nam Ho Kim, Gwangmyeong-si (KR); Mi Ran Park, Hwaseong-si (KR); Ha Yeon Kwon, Seoul (KR); Byung Joo Chung, Gunpo-si (KR); Seung Hak Lee, Asan-si (KR); Min Seok Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/101,482

(22) Filed: Jan. 25, 2023

(65) Prior Publication Data

US 2024/0109595 A1 Apr. 4, 2024

(30) Foreign Application Priority Data

Oct. 4, 2022 (KR) ......................... 10-2022-0126369

(51) Int. Cl.
*B62D 24/04* (2006.01)
*B62D 21/02* (2006.01)
(Continued)

(52) U.S. Cl.
CPC ............ *B62D 24/04* (2013.01); *B62D 21/02* (2013.01); *B62D 21/11* (2013.01); *B62D 21/152* (2013.01);
(Continued)

(58) Field of Classification Search
CPC ........ B62D 24/04; B62D 21/11; B62D 25/02; B62D 63/025; B62D 21/02; B62D 21/152;
(Continued)

(56) References Cited

U.S. PATENT DOCUMENTS 1,303,391 A * 5/1919 Reich ...................... H02K 5/00
248/624
3,069,149 A * 12/1962 Neff ..................... B60G 17/021
267/33

(Continued)

FOREIGN PATENT DOCUMENTS

CN 108974125 A 12/2018
JP 2007276623 A * 10/2007
(Continued)

*Primary Examiner* — Timothy Wilhelm
(74) *Attorney, Agent, or Firm* — Lempia Summerfield Katz LLC

(57) ABSTRACT

A frame structure for a vehicle includes: an inner panel connected to a side member and defining an inner side of a rear part of the side member; an outer panel connected to a rear side of the side member and coupled to an outer side of the inner panel defining a closed cross-section together with the inner panel and defining an outer side of the rear part of the side member; an opening portion formed below the inner and outer panels partially opening the closed cross-section so that a front end of a rear suspension arm can be inserted into the opening portion; and a reinforcing member disposed in the opening portion defining the closed cross-section together with the outer panel and the inner panel and configured to close an internal space in the outer and inner panels.

13 Claims, 13 Drawing Sheets

(51) Int. Cl.
*B62D 21/11* (2006.01)
*B62D 21/15* (2006.01)
*B62D 25/02* (2006.01)
*B62D 25/08* (2006.01)
*B62D 27/06* (2006.01)
*B62D 63/02* (2006.01)

(52) U.S. Cl.
CPC ........... *B62D 25/02* (2013.01); *B62D 25/088* (2013.01); *B62D 27/065* (2013.01); *B62D 63/025* (2013.01); *B60Y 2200/91* (2013.01); *B60Y 2306/01* (2013.01); *Y02T 10/64* (2013.01)

(58) Field of Classification Search
CPC .... B62D 25/088; B62D 27/065; B60G 3/145; B60G 99/002; B60Y 2200/91; B60Y 2306/01; Y02T 10/64
See application file for complete search history.

(56) References Cited

U.S. PATENT DOCUMENTS

| | | | | |
|---|---|---|---|---|
| 3,084,971 A * | 4/1963 | Schilberg | ............... | B62D 24/02 296/35.1 |
| RE32,486 E * | 9/1987 | Raidel, Jr. | ............... | B60G 9/003 267/67 |
| 5,180,206 A * | 1/1993 | Toyoda | ............... | B62D 25/088 280/124.145 |
| 6,165,588 A * | 12/2000 | Wycech | ................ | B29C 44/18 293/109 |
| 6,390,437 B1 * | 5/2002 | Hong | .................... | B62D 21/09 180/312 |
| 6,595,313 B2 * | 7/2003 | Cheong | ................ | B62D 25/082 180/312 |
| 8,490,988 B2 * | 7/2013 | Takeshita | ............... | B62D 21/11 280/124.109 |
| 9,156,501 B2 * | 10/2015 | Mildner | ............... | B62D 25/088 |
| 9,156,504 B2 * | 10/2015 | Terada | .................... | B60G 3/20 |
| 9,399,384 B2 * | 7/2016 | Lee | ..................... | B60G 21/007 |
| 9,701,345 B2 * | 7/2017 | Kanemori | ............... | B60G 3/06 |
| 9,738,147 B2 * | 8/2017 | Hlubina | ............... | B62D 25/082 |
| 10,745,061 B2 * | 8/2020 | Wada | .................... | B62D 25/08 |
| 10,953,719 B2 * | 3/2021 | Kiehn | .................... | B62D 21/11 |
| 11,142,261 B2 * | 10/2021 | Nakauchi | ............... | B62D 25/08 |
| 11,247,525 B2 * | 2/2022 | Kim | .................... | B60G 7/001 |
| 11,511,806 B2 * | 11/2022 | Kimura | ................. | B60G 3/202 |
| 11,718,344 B2 * | 8/2023 | Chino | ................ | B62D 25/2036 280/781 |
| 2020/0215868 A1 * | 7/2020 | Kim | ..................... | B60G 21/052 |
| 2021/0300471 A1 | 9/2021 | Eklund | | |
| 2021/0331749 A1 | 10/2021 | Hwang et al. | | |
| 2022/0281529 A1 * | 9/2022 | Chino | .................. | B62D 25/025 |
| 2023/0227105 A1 * | 7/2023 | Lee | ..................... | B62D 63/025 280/124.109 |

FOREIGN PATENT DOCUMENTS

| | | |
|---|---|---|
| JP | 2010111154 A | 5/2010 |
| JP | 2015098238 A | 5/2015 |
| JP | 2016112913 A | 6/2016 |
| JP | 2020199881 A | 12/2020 |
| KR | 20050070850 A | 7/2005 |
| KR | 20210130883 A | 11/2021 |
| KR | 20230111947 A | 7/2023 |

* cited by examiner

FRAME STRUCTURE FOR A VEHICLE

CROSS REFERENCE TO RELATED APPLICATION

The present application claims priority to Korean Patent Application No. 10-2022-0126369, filed Oct. 4, 2022, the entire contents of which are incorporated herein for all purposes by this reference.

BACKGROUND

Field of the Disclosure

The present disclosure relates to a technology associated with a frame structure for a vehicle.

Description of the Related Art

A purpose-built vehicle (PBV) includes a life module configured to define passenger and loading spaces having various shapes in accordance with the market demand, and a drive module substantially related to driving the vehicle. The life module, which may meet various demands, may be coupled to the predetermined drive module, such that various types of vehicles may be easily produced. This makes it possible to very effectively follow the market trend of diversified small-quantity production.

In the related art, in the case of a rear wheel suspension for a vehicle, a front side of the suspension may be supported on an outer portion of a side member of a vehicle frame by a separate bracket. However, in the case of a PBV or an electric vehicle equipped with a high-voltage battery (hereinafter, simply referred to as a "battery") mounted at a lower side of the vehicle, a width between two opposite side members of a frame is increased to improve the ability to mount or install the battery. This makes it difficult to support a front side of a rear wheel suspension on an outer portion of the side member, like the related art.

The foregoing explained as the background of the disclosure is intended merely to aid in understanding the background of the present disclosure. The foregoing is not intended to mean that the present disclosure falls within the purview of the related art that is already known to those of ordinary skill in the art.

SUMMARY

The present disclosure is proposed to solve these problems and aims to provide a frame structure for a vehicle, which is applied to a PBV or an electric vehicle equipped with a battery mounted at a lower side of the vehicle and which allows a front side of a rear wheel suspension to be compactly and securely fixed to the frame structure without protruding outwardly relative to the vehicle. The disclosed frame structure makes it possible to ensure that the battery of the vehicle can be properly mounted or installed and provide excellent or satisfactory rigidity against a rear collision of the vehicle.

To achieve the above-mentioned objects, the present disclosure provides a frame structure for a vehicle. The frame structure includes an inner panel connected to a rear side a middle part of a side member and defining an inner side of a rear part of the side member. The frame structure also includes an outer panel connected to the rear side of the middle part of the side member and coupled to an outer side of the inner panel and defining a closed cross-section together with the inner panel and defining an outer side of the rear part of the side member. The frame structure further includes an opening portion formed below the inner panel and the outer panel partially opening the closed cross-section defined by the inner panel and the outer panel so that a front end of a rear suspension arm can be inserted into the opening portion. The frame structure also includes a first reinforcing member disposed in the opening portion and defining the closed cross-section together with the outer panel and the inner panel and closing an internal space, which is surrounded by the outer panel and the inner panel.

The opening portion may have a kick-up part formed at a lower side thereof. The kick-up part may be curved upward from a portion where the rear part of the side member is connected to the middle part.

The first reinforcing member may define a closed portion of the internal space in a vertical transverse section of the side member together with the outer panel and the inner panel.

The closed portion may have a shape in which a first space elongated in a transverse direction and a second space elongated in a vertical direction communicate with each other.

The closed cross-section may be defined in the vertical transverse section of the side member by the first reinforcing member together with the outer panel and the inner panel and may have an inverted 'L' shape.

The first reinforcing member may include: a front portion blocking a vehicle front side of the opening portion; a rear portion blocking a vehicle rear side of the opening portion; an intermediate portion connecting the front portion and the rear portion and defining the first space elongated in the transverse direction; and a side portion connecting the front portion, the intermediate portion, and the rear portion and defining the second space elongated in the vertical direction together with the inner panel.

The first reinforcing member may have a flange provided at a lower side the side portion and coupled to a lower end of the inner panel. The first reinforcing member may also have a flange coupled to an inner surface of the outer panel and provided at lower sides of the front portion, the intermediate portion, and the rear portion.

A nut may be provided between the side portion and the inner panel and fastened to a fastening bolt that penetrates the outer panel and can penetrate a rear suspension arm of a vehicle suspension and support the rear suspension arm so that the rear suspension arm is rotatable.

An end of the nut may be fixedly coupled to a lateral surface of the side portion in a state in which the nut penetrates the inner panel.

At least one additional reinforcing member may be provided at a front side of the front portion of the first reinforcing member and installed in the space defined by the inner panel and the outer panel.

The additional reinforcing member may include a second reinforcing member and a third reinforcing member spaced apart from each other to respectively define partition walls in the vertical direction in the space defined by the inner panel and the outer panel.

In addition, to achieve the above-mentioned objects, the present disclosure provides a frame structure for a vehicle. The frame structure includes: an opening portion provided at a rear side of a side member and disposed at a lower side of a kick-up part; a first reinforcing member defining a space in the opening portion to support a front end of a rear suspension arm, the first reinforcing member defining an internal space in the side member by blocking a part of the opening portion; and an additional reinforcing member provided in the side member to support a front side of the first reinforcing member.

A portion of the side member having the opening portion may be configured such that an inner panel positioned to face inward relative to a vehicle and an outer panel positioned to face outward relative to the vehicle are connected to each other to define a closed cross-section.

The first reinforcing member may be configured to define a closed portion within the closed cross-section in a vertical transverse section of the side member together with the outer panel and the inner panel. The closed portion may have a shape in which a first space elongated in a transverse direction and a second space elongated in a vertical direction communicate with each other.

The first reinforcing member may include: a front portion blocking a vehicle front side of the opening portion; a rear portion blocking a vehicle rear side of the opening portion; an intermediate portion connecting the front portion and the rear portion and defining the first space elongated in the transverse direction; and a side portion connecting the front portion, the intermediate portion, and the rear portion and defining the second space elongated in the vertical direction together with the inner panel.

A front end of a rear suspension arm may be inserted between the outer panel and the side portion of the first reinforcing member. The rear suspension arm may be rotatably supported by a fastening bolt that sequentially penetrates the outer panel, the rear suspension arm, and the side portion.

A nut may be fixed by the side portion and the inner panel. The fastening bolt may sequentially penetrate the outer panel, the rear suspension arm, and the side portion and be fastened to the nut.

The additional reinforcing member may include a second reinforcing member and a third reinforcing member respectively provided to define partition walls arranged in a vertical direction and spaced apart from one another at the front side of the first reinforcing member.

The present disclosure may provide a frame structure for a vehicle, which is applied to a PBV or an electric vehicle equipped with a battery mounted at a lower side of the vehicle and which allows the front side of the rear wheel suspension to be compactly and securely fixed to the frame structure without protruding outwardly relative to the vehicle. The frame structure makes it possible to ensure that the battery of the vehicle can be properly mounted and provide excellent or satisfactory rigidity against a rear collision of the vehicle.

DETAILED DESCRIPTION

Figure 1:
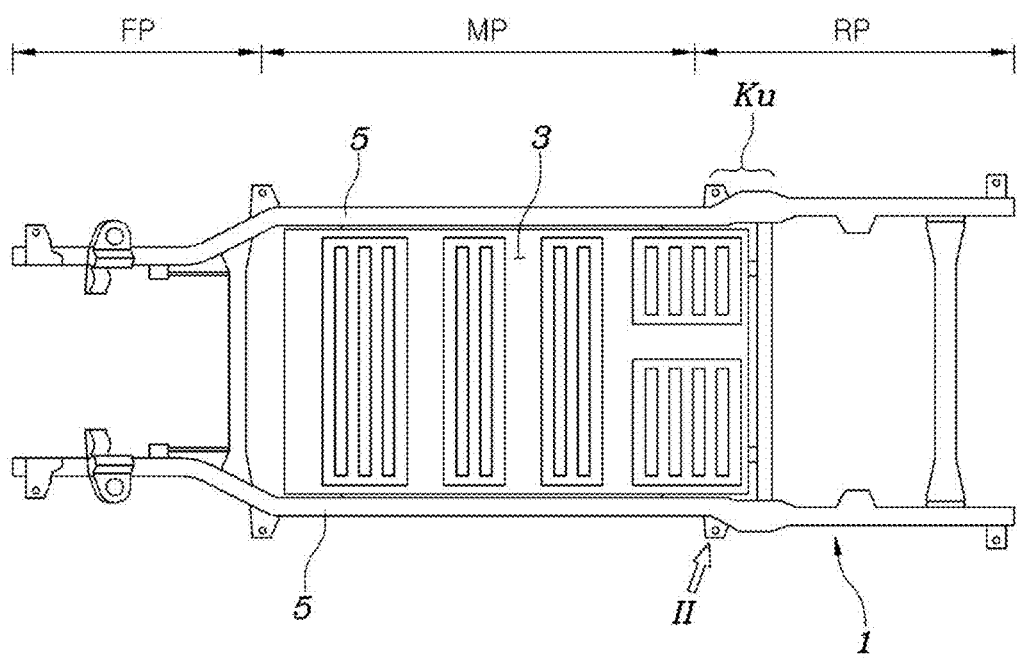
FIG. 1 is a top plan view illustrating a frame structure for a vehicle according to the present disclosure.

Hereinafter, embodiments disclosed in the present specification are described in detail with reference to the accompanying drawings. The same or similar constituent elements are assigned the same reference numerals throughout the drawings, and the repetitive descriptions thereof have been omitted.

The suffixes 'module', 'unit', 'part', 'portion,' and the like used to describe constituent elements in the following description are used together or interchangeably in order to facilitate the description, but the suffixes themselves do not have distinguishable meanings or functions.

In the description of the embodiments disclosed in the present specification, the specific descriptions of publicly known related technologies have been omitted where it is determined that the specific descriptions may obscure the subject matter of the embodiments disclosed in the present specification. In addition, it should be understood that the accompanying drawings are provided only to aid those having ordinary skill in the art to understand the embodiments disclosed in the present specification. The technical spirit disclosed in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as having different meanings in context. When a component, device, member, part, element, or the like of the present disclosure is described as having a purpose or performing an operation, function, or the like, the component, device, member, part, or element should be considered herein as being "configured to" meet that purpose or perform that operation or function.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof. Such terms do not preclude the presence or addition of one or more other features, integers, steps, operations, elements, components, or combinations thereof.

FIG. 1 is a view illustrating a frame structure for a vehicle to which the present disclosure is applied. A frame 1 may include a front part FP, a middle part MP, and a rear part RP in a longitudinal direction of a vehicle. A battery 3 is mounted inside the middle part MP.

Referring to FIGS. 1-13, the frame structure for a vehicle according to the embodiment of the present disclosure includes an inner panel 7 connected to a rear side of a side member 5 in the middle part MP and configured to define an inner side of the side member 5 in the rear part RP. The frame structure also includes an outer panel 9 connected to the rear side of the side member 5 in the middle part MP and coupled to an outer side of the inner panel 7 to define a closed cross-section together with the inner panel 7 and to define an outer side of the side member in the rear part RP. The frame structure further includes an opening portion 13 formed below the inner panel 7 and the outer panel 9 to partially open the closed cross-section defined by the inner panel 7 and the outer panel 9. Thus, a front end of a rear suspension arm 11 of a vehicle suspension can be inserted into the opening portion 13. The frame structure also includes a first reinforcing member 15 disposed in the opening portion 13 to define the closed cross-section together with the outer panel 9 and the inner panel 7. The first reinforcing member 15 is configured to close an internal space, which is surrounded by the outer panel 9 and the inner panel 7, from the outside environment.

In other words, in the present disclosure, the opening portion 13 is formed in the rear part RP connected to the rear side of the side member 5 in the middle part MP. The first reinforcing member 15 is provided in the opening portion 13, and, in this state, a front side of the rear suspension arm 11 is fixed to the rear part RP.

In one embodiment, the opening portion 13 has a kick-up part Ku formed at a lower side thereof. The kick-up part Ku is curved upward from a portion where the rear part RP of the side member 5 is connected to the middle part MP.

Figure 2:
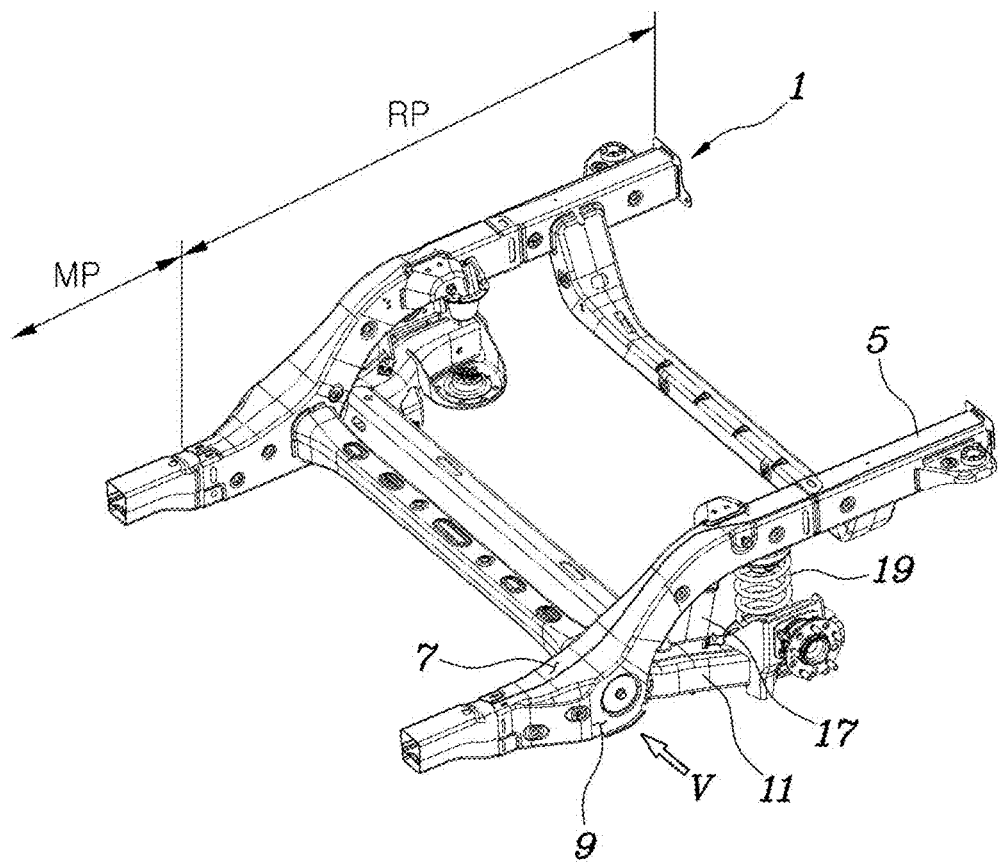
FIG. 2 is a perspective view of the frame structure observed in direction II in FIG. 1.
Figure 3:
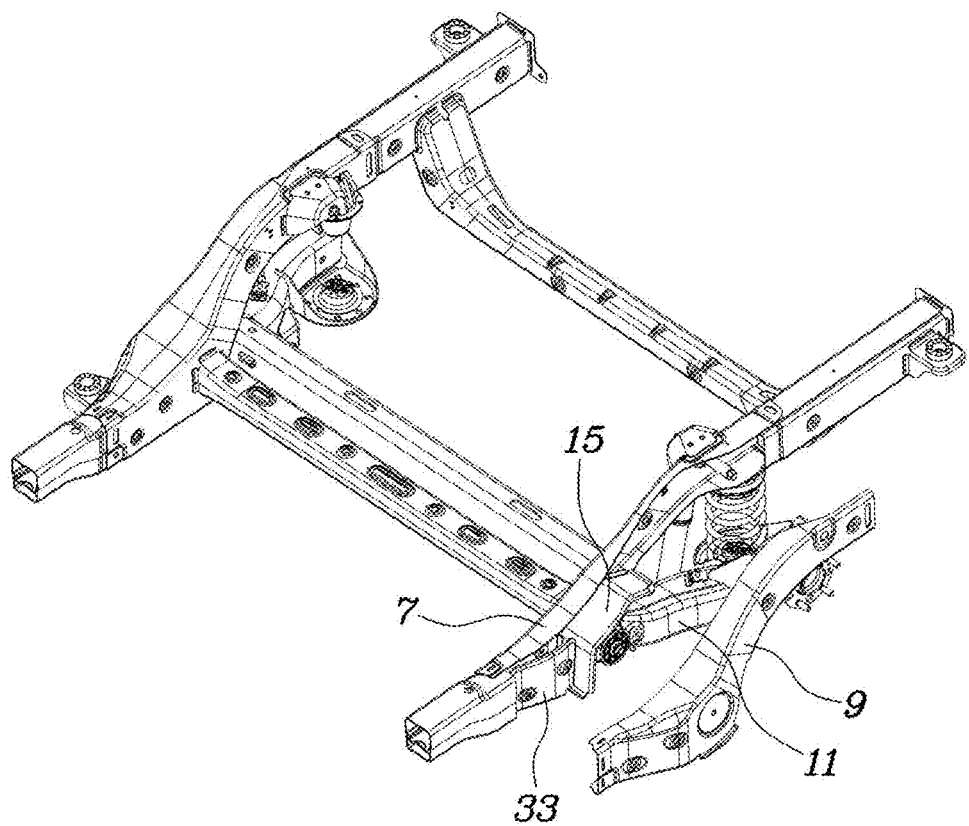
FIG. 3 is a view illustrating a state in which an outer panel is separated from the frame structure illustrated in FIG. 2.
Figure 4:
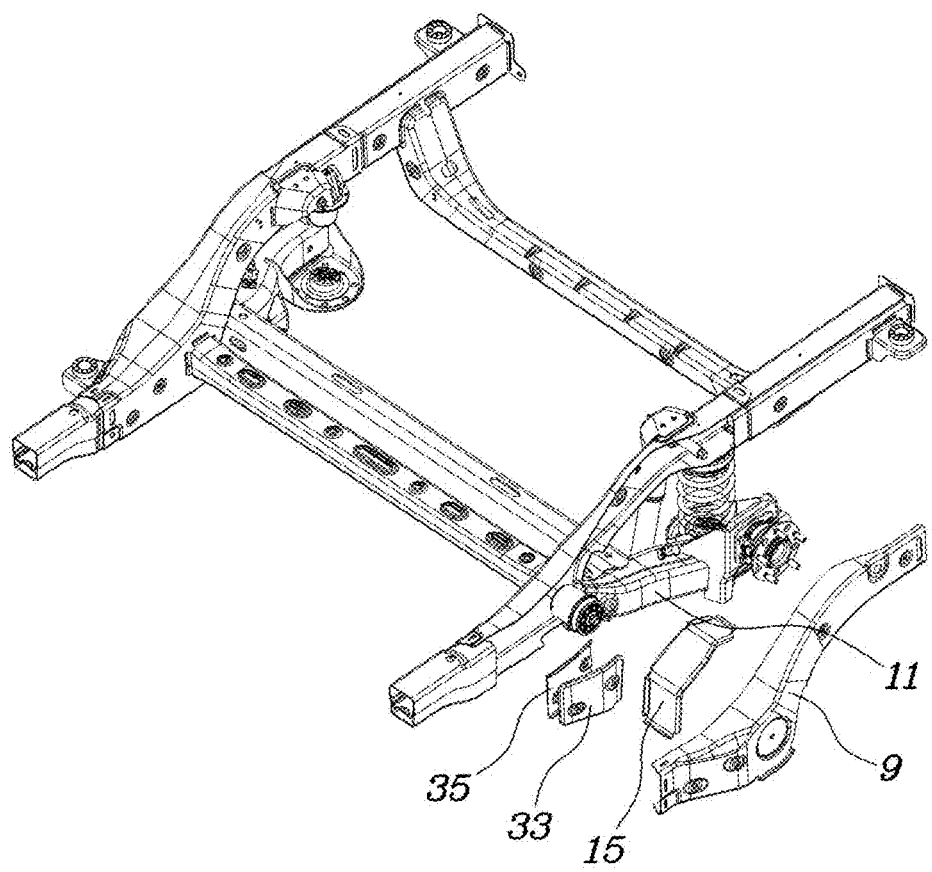
FIG. 4 is a view illustrating a state in which a first reinforcing member, a second reinforcing member, and a third reinforcing member are separated from the frame structure illustrated in FIG. 3.
Figure 5:
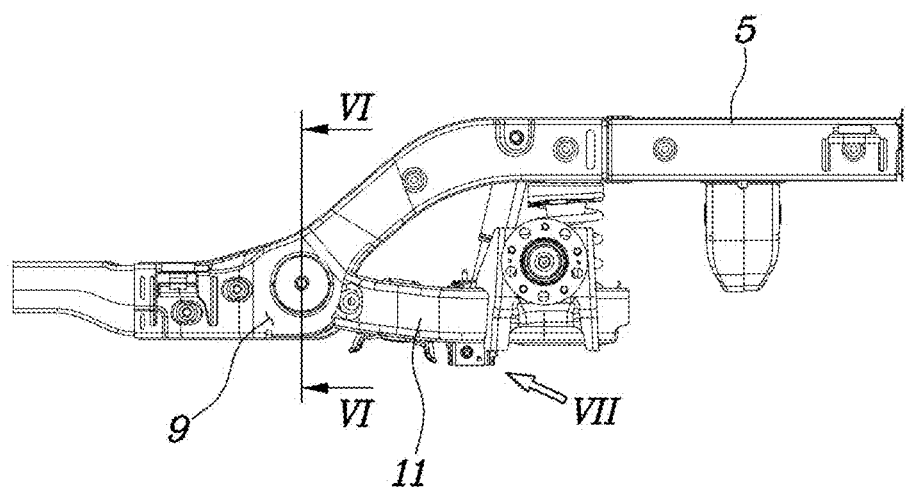
FIG. 5 is a view illustrating a side member rear part of the frame structure observed in direction V in FIG. 2.

Therefore, the rear suspension arm 11 may be installed in an approximately horizontal state in a forward/rearward direction of the vehicle without being inclined excessively toward the lower side of the vehicle. As illustrated in FIG. 2, a shock absorber 17 and a spring 19 or the rear suspension are installed between the rear suspension arm 11 and the rear part RP of the side member 5. Thus, it is possible to implement a rear suspension having an appropriate structure on the disclosed frame structure, i.e., the frame 1.

The opening portion 13 provides a space in which the rear suspension arm 11 may be fixed. However, the opening portion 13 has a structure that partially opens the closed cross-section defined by the inner panel 7 and the outer panel 9. The partially opened structure may cause a deterioration or reduction in structural rigidity. For this reason, the side member 5 may be severely deformed in the vicinity of the opening portion 13 in the event of a rear collision accident of the vehicle.

However, according to the present disclosure, the first reinforcing member 15 may ensure sufficient rigidity in the vicinity of the opening portion 13. Therefore, it is possible to inhibit the deformation of the side member 5 by increasing the rigidity even in the event of a rear collision of the vehicle. The first reinforcing member 15 also provides excellent or satisfactory performance in coping with a rear collision and provides an optimal space in which the rear suspension arm 11 can be installed.

In one embodiment, the first reinforcing member 15 is configured to define a closed portion C in the internal space of the closed cross-section. The closed portion C is defined in a vertical and transverse section of the side member 5 together with the outer panel 9 and the inner panel 7. The closed portion C has a shape in which a first space A elongated in a transverse direction and a second space B elongated in an vertical direction communicate with each other.

Figure 6:
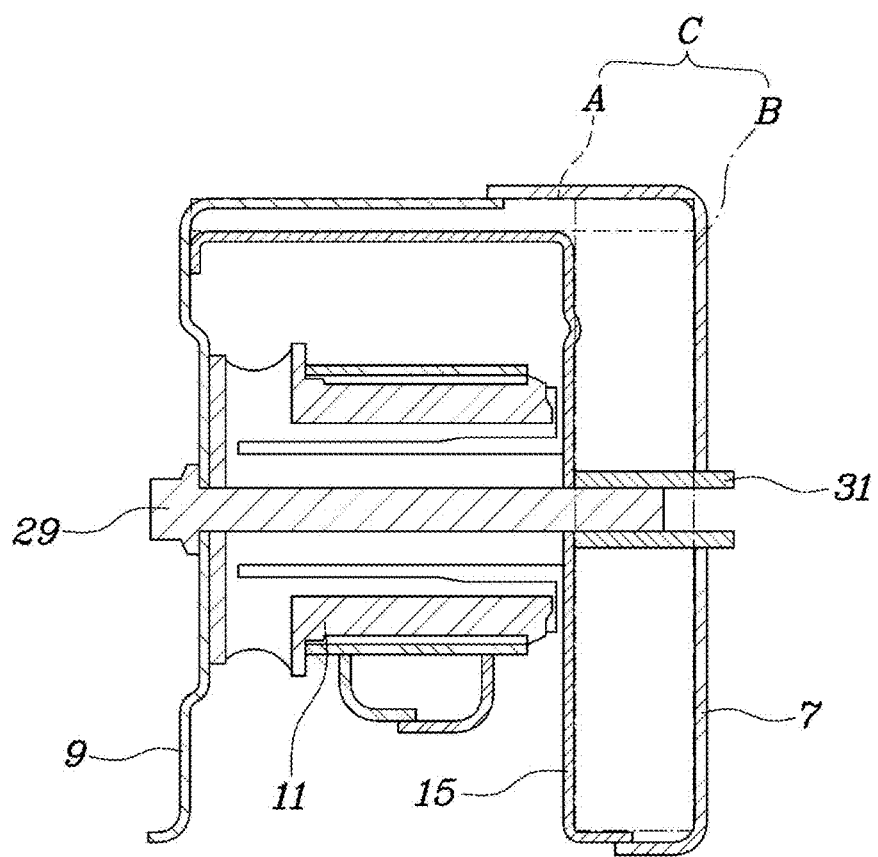
FIG. 6 is a cross-sectional view taken along line VI-VI in FIG. 5.
Figure 7:
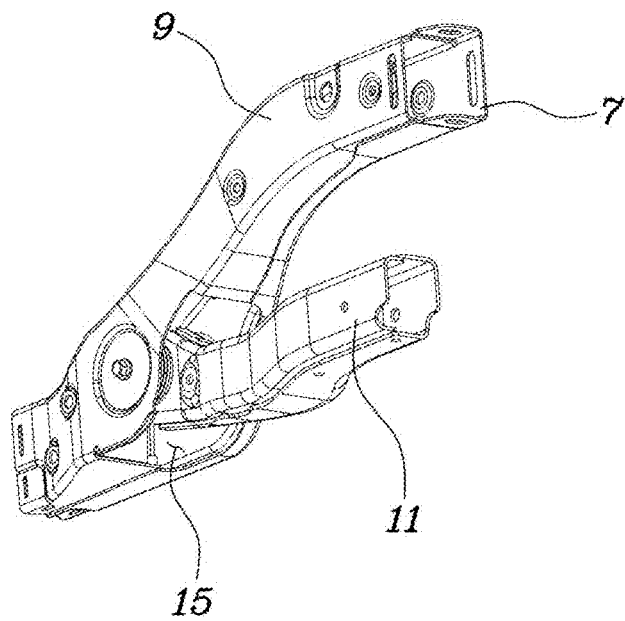
FIG. 7 is a view of part of the frame structure observed in direction VII in FIG. 5.
Figure 8:
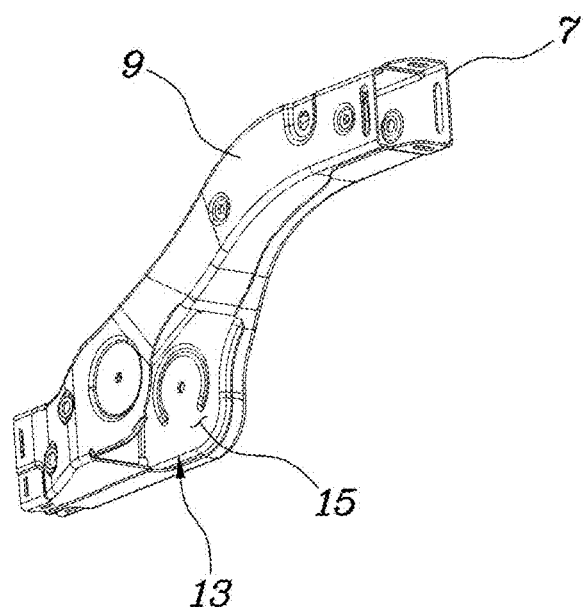
FIG. 8 is a view illustrating a state in which a rear suspension arm is removed from the part of the frame structure illustrated in FIG. 7.
Figure 9:
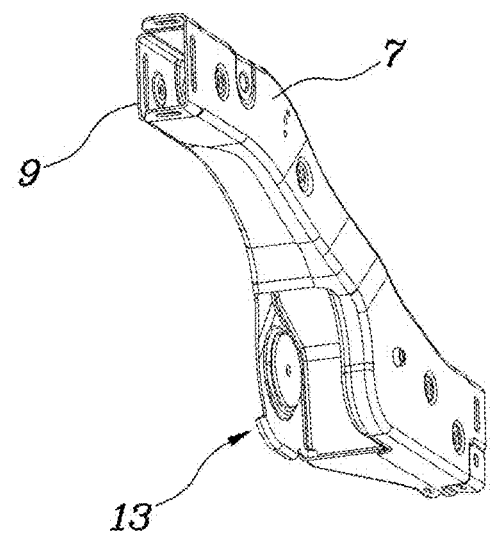
FIG. 9 is a view of the part of the frame structure illustrated in FIG. 8 from another angle.
Figure 10:
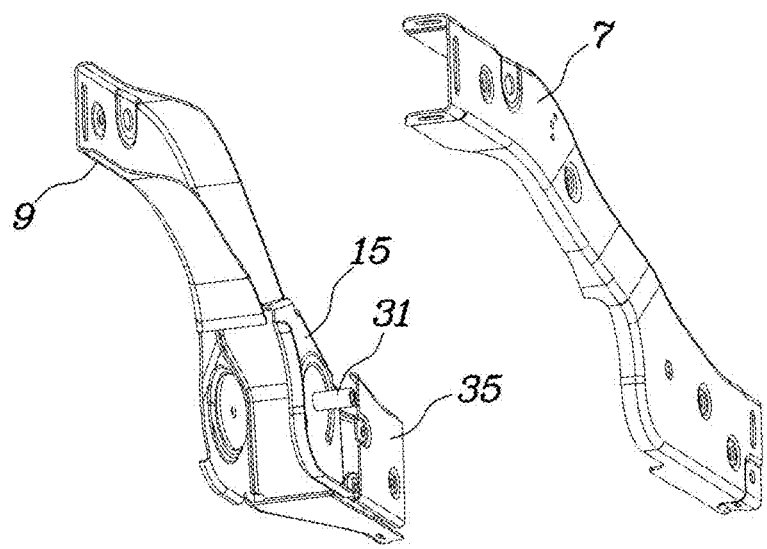
FIG. 10 is a view illustrating a state in which an inner panel is separated from the part of the frame structure illustrated in FIG. 9.
Figure 11:
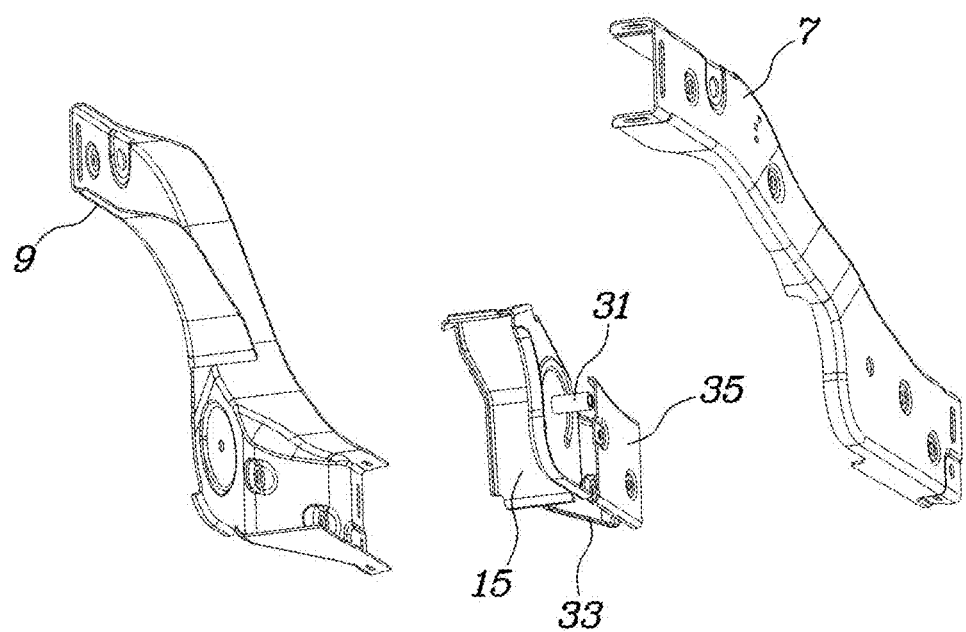
FIG. 11 is a view illustrating a state in which the outer panel is separated from the first reinforcing member of the frame structure illustrated in FIG. 10.

In other words, as illustrated in FIG. 6, the closed portion C is formed in the vertical and transverse section of the side member 5 by the first reinforcing member 15, the outer panel 9, and the inner panel 7. The closed portion C has an inverted 'L' shape in which the first space A elongated in the transverse direction and the second space B elongated in the vertical direction communicate with each other.

Therefore, the opening portion 13 formed below the kick-up part Ku of the side member 5 is partially closed by the first reinforcing member 15. Thus, the above-mentioned closed cross-section structure thereby improves rigidity of the frame.

The first reinforcing member 15 includes a front portion 21 formed to block a vehicle front side of the opening portion 13 and a rear portion 23 formed to block a vehicle rear side of the opening portion 13. The first reinforcing member 15 also includes an intermediate portion 25 configured to connect the front portion 21 and the rear portion 23 and having a space elongated in the transverse direction, and has a side portion 27 configured to connect the front portion 21, the intermediate portion 25, and the rear portion 23 and to define a space elongated in the vertical direction together with the inner panel 7.

Figure 12:
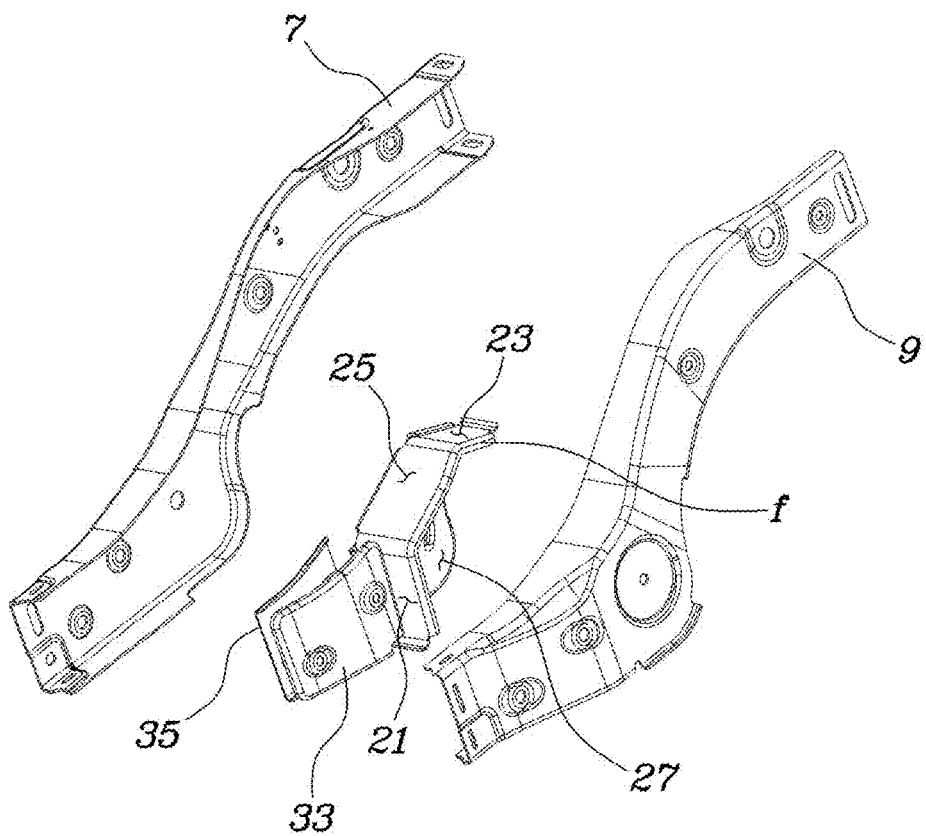
FIG. 12 is a view of the part of the frame structure illustrated in FIG. 11 from another angle.
Figure 13:
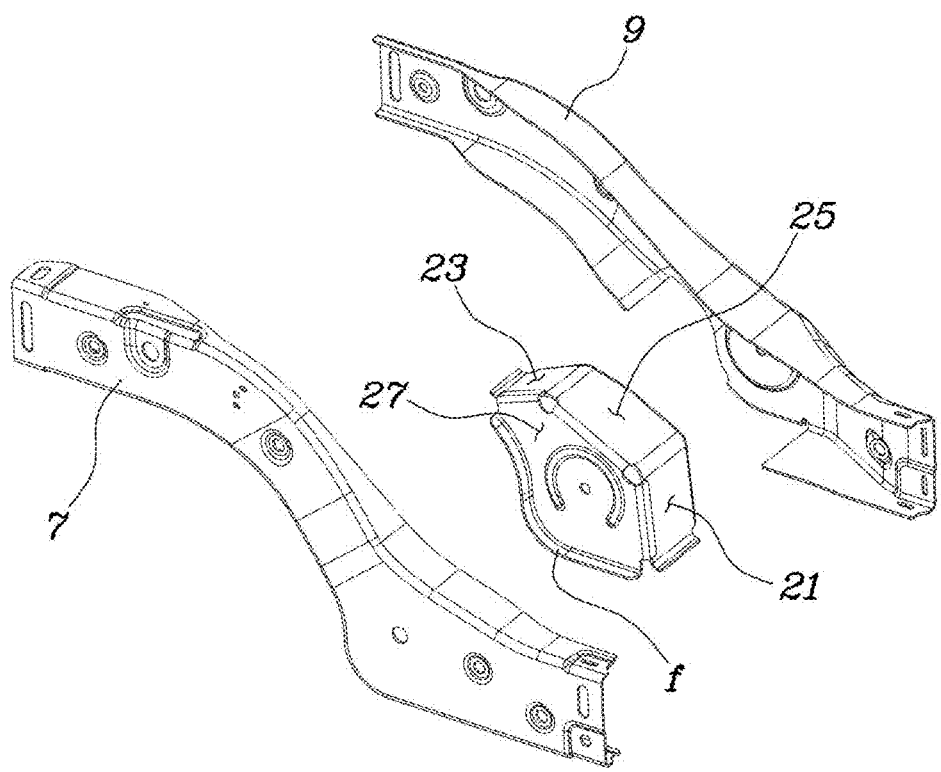
FIG. 13 is a view illustrating a state in which the second reinforcing member and the third reinforcing member are removed from the part of the frame structure illustrated in FIG. 12 and viewed from another angle.

The first reinforcing member 15 has a flange f provided at a lower side of the side portion 27 and configured to be coupled to a lower end of the inner panel 7, as depicted in FIGS. 6 and 13. The reinforcing member 14 also has a flange f configured to be coupled to an inner surface of the outer panel 9 and which is provided at lower sides of the front portion 21, the intermediate portion 25, and the rear portion 23, as depicted in FIGS. 6 and 12.

Therefore, the first reinforcing member 15 defines the inverted 'L'-shaped closed portion in the opening portion 13. The closed portion is formed as the lower side of the side portion 27 is coupled to the lower end of the inner panel 7 by welding and the lower sides of the front portion 21, the intermediate portion 25, and the rear portion 23 are coupled to the inner surface of the outer panel 9 by welding or the like. Further, the inverted 'L'-shaped closed portion is defined to block or close off the internal space, which is defined between the inner panel 7 and the outer panel 9, from the outside environment.

Therefore, the first reinforcing member 15 inhibits foreign substances such as moisture from being introduced into the internal space defined between the inner panel 7 and the outer panel 9 when the vehicle is driven. This ultimately improves the durability of the side member 5.

A nut 31, such as an elongate nut, long nut, coupling nut, rod nut, connecting nut, etc. (hereinafter "nut") is provided.

The length of the nut allows it to extend between the side portion 27 and the inner panel 7, as shown in FIG. 6. A fastening bolt can sequentially penetrate the outer panel 9 and the rear suspension arm 11, when installed, and can support the rear suspension arm 11 so that the rear suspension arm 11 is rotatable, as shown in FIGS. 2 and 5-7.

An end of the nut 31 fixedly coupled to a lateral surface of the side portion 27 in a state in which the nut 31 penetrates the inner panel 7.

In other words, the end of the nut 31 may be coupled to the lateral surface of the side portion 27 by welding or the like. The portion of the nut 31, which penetrates the inner panel 7, may be coupled to the inner panel 7 by welding or the like.

Therefore, the nut 31 may ensure a securely coupled state between the rear suspension arm 11 and the frame 1 without protruding from the side portion 27 toward the outer panel 9. Therefore, the rear suspension arm 11 may be easily assembled because interference caused by the nut 31 is prevented when the rear suspension arm 11 is inserted between the outer panel 9 and the side portion 27. Therefore, it is possible to ensure a securely supported state of the rear suspension arm 11 by the fastening bolt 29.

In addition, the nut 31 serves as a column for connecting the inner panel 7 and the side portion 27 of the first reinforcing member 15 and also serves to further improve rigidity of the opening portion 13.

At least one additional reinforcing member may be provided at the front side of the front portion 21 of the first reinforcing member 15 and may be installed in the space defined by the inner panel 7 and the outer panel 9.

In one embodiment, the additional reinforcing member may include a second reinforcing member 33 and a third reinforcing member 35, as shown in FIGS. 3, 4, 11, and 12. The second and third reinforcing members 33 and 35 may be installed to be spaced apart from each other and to respectively define partition walls in the vertical direction in the space defined by the inner panel 7 and the outer panel 9.

When an impact is transmitted through the side member 5 and transmitted to the front side through the opening portion 13 in the event of a rear collision or accident of the vehicle, the second reinforcing member 33 and the third reinforcing member 35 serve to support the impact. This makes it possible to ultimately improve the rigidity of the side member 5 and the performance of the frame 1 in coping with a rear collision of the vehicle.

The frame structure of the present disclosure may also be expressed as follows.

The frame structure for a vehicle according to the embodiment of the present disclosure includes the opening portion 13 provided at the rear side of the side member 5 and disposed at the lower side of the kick-up part Ku. The first reinforcing member 15 is configured to define the space in the opening portion 13 to support the front end of the rear suspension arm 11. The first reinforcing member 15 is configured to define the internal space of the side member 5 and can block or close off a part of the opening portion 13 to close off the internal space from the outside environment. The additional reinforcing member or members are provided in the side member 5 to support the front side of the first reinforcing member 15.

The portion of the side member 5 having the opening portion 13 is configured such that the inner panel 7 positioned facing inwardly relative to the vehicle and the outer panel 9 positioned facing outwardly relative to the vehicle are connected to each other to define a closed cross-section.

The first reinforcing member 15 is configured to define a closed portion of the internal space within the closed cross-section in a vertical and transverse section of the side member together with the outer panel 9 and the inner panel 7. The closed portion has a shape in which the first space A elongated in the transverse direction and the second space B elongated in the vertical direction communicate with each other.

The first reinforcing member 15 includes the front portion 21 formed to block the vehicle front side of the opening portion 13 and includes the rear portion 23 formed to block the vehicle rear side of the opening portion 13. The first reinforcing member 15 also includes the intermediate portion 25 configured to connect the front portion 21 and the rear portion 23 and having the first space A elongated in the transverse direction. The first reinforcing member 15 further includes the side portion 27 configured to connect the front portion 21, the intermediate portion 25, and the rear portion 23 and defines the second space B elongated in the vertical direction together with the inner panel 7.

The front end of the rear suspension arm 11 can be inserted between the outer panel 9 and the side portion 27 of the first reinforcing member 15. The rear suspension arm 11 is rotatably supported, when installed, by the fastening bolt 29 that sequentially penetrates the outer panel 9, and the rear suspension arm 11, and the side portion 27.

The nut 31 is fixed by the side portion 27 and the inner panel 7. The fastening bolt 29 sequentially penetrates the outer panel 9, the rear suspension arm 11, and the side portion 27 and is fastened to the nut 31.

The additional reinforcing member may include the second reinforcing member 33 and the third reinforcing member 35 respectively provided to define partition walls in the vertical direction at the front side of the first reinforcing member 15. The partition walls are spaced apart from each other.

While the specific embodiments of the present disclosure have been illustrated and described, it should be apparent to those of ordinary skill in the art that the embodiments of the present disclosure may be variously modified and changed without departing from the technical spirit of the present disclosure defined in the appended claims.

What is claimed is:

1. A frame structure for a vehicle, the frame structure comprising:
   an inner panel connected to a rear side of a middle part of a side member and defining an inner side of a rear part of the side member;
   an outer panel connected to the rear side of the middle part of the side member and coupled to an outer side of the inner panel and defining a closed cross-section together with the inner panel and defining an outer side of the rear part of the side member;
   an opening portion formed below the inner panel and the outer panel partially opening the closed cross-section defined by the inner panel and the outer panel so that a front end of a rear suspension arm can be inserted into the opening portion; and
   a first reinforcing member disposed in the opening portion and defining the closed cross-section together with the outer panel and the inner panel and closing an internal space, which is surrounded by the outer panel and the inner panel,
   wherein the first reinforcing member has a front portion blocking a vehicle front side of the opening portion,
   wherein the front portion of the first reinforcing member is configured to support an additional reinforcing member provided at a front side of the front portion of the first reinforcing member and installed in the space defined by the inner panel and the outer panel,
wherein the first reinforcing member defines a closed portion of the internal space in a vertical transverse section of the side member together with the outer panel and the inner panel, the closed portion having a shape in which a first space elongated in a transverse direction and a second space elongated in a vertical direction communicate with each other, and
wherein the closed portion is defined in the vertical transverse section of the side member by the first reinforcing member together with the outer panel and the inner panel and has an inverted 'L' shape.

2. The frame structure of claim 1, wherein the opening portion has a kick-up part formed at a lower side thereof, and wherein the kick-up part is curved upward from a portion where the rear part of the side member is connected to the middle part.

3. The frame structure of claim 1, wherein the first reinforcing member comprises:
a rear portion blocking a vehicle rear side of the opening portion;
an intermediate portion connecting the front portion and the rear portion and defining the first space elongated in the transverse direction; and
a side portion connecting the front portion, the intermediate portion, and the rear portion and defining the second space elongated in the vertical direction together with the inner panel.

4. The frame structure of claim 3, wherein the first reinforcing member has a flange provided at a lower side the side portion and coupled to a lower end of the inner panel, and has a flange coupled to an inner surface of the outer panel and provided at lower sides of the front portion, the intermediate portion, and the rear portion.

5. The frame structure of claim 3, wherein a nut is provided between the side portion and the inner panel and fastened to a fastening bolt that penetrates the outer panel and can penetrate a rear suspension arm of a vehicle suspension and support the rear suspension arm so that the rear suspension arm is rotatable.

6. The frame structure of claim 5, wherein an end of the nut is fixedly coupled to a lateral surface of the side portion in a state in which the nut penetrates the inner panel.

7. A frame structure for a vehicle, the frame structure comprising:
an inner panel connected to a rear side of a middle part of a side member and defining an inner side of a rear part of the side member;
an outer panel connected to the rear side of the middle part of the side member and coupled to an outer side of the inner panel and defining a closed cross-section together with the inner panel and defining an outer side of the rear part of the side member;
an opening portion formed below the inner panel and the outer panel partially opening the closed cross-section defined by the inner panel and the outer panel so that a front end of a rear suspension arm can be inserted into the opening portion; and
a first reinforcing member disposed in the opening portion and defining the closed cross-section together with the outer panel and the inner panel and closing an internal space, which is surrounded by the outer panel and the inner panel,
wherein the first reinforcing member has a front portion blocking a vehicle front side of the opening portion;
wherein the front portion of the first reinforcing member is configured to support an additional reinforcing member provided at a front side of the front portion of the first reinforcing member and installed in the space defined by the inner panel and the outer panel, and
wherein the additional reinforcing member comprises a second reinforcing member and a third reinforcing member spaced apart from each other to respectively define partition walls in the vertical direction in the space defined by the inner panel and the outer panel.

8. A frame structure for a vehicle, the frame structure comprising:
an opening portion provided at a rear side of a side member and disposed at a lower side of a kick-up part;
a first reinforcing member defining a space in the opening portion to support a front end of a rear suspension arm, the first reinforcing member defining an internal space in the side member by blocking a part of the opening portion; and
an additional reinforcing member provided in the side member to support a front side of the first reinforcing member,
wherein the first reinforcing member has a front portion blocking a vehicle front side of the opening portion;
wherein the front portion of the first reinforcing member is configured to support the additional reinforcing member provided at a front side of the front portion of the first reinforcing member and installed in the side member, and
wherein the additional reinforcing member comprises a second reinforcing member and a third reinforcing member respectively defining partition walls arranged in a vertical direction and spaced apart from each other at the front side of the first reinforcing member.

9. The frame structure of claim 8, wherein a portion of the side member having the opening portion is configured such that an inner panel positioned relatively inside a vehicle and an outer panel positioned relatively outside the vehicle are connected to each other to define a closed cross-section.

10. The frame structure of claim 9, wherein the first reinforcing member is configured to define a closed portion within the closed cross-section in a vertical transverse section of the side member together with the outer panel and the inner panel, the closed portion having a shape in which a first space elongated in a transverse direction and a second space elongated in a vertical direction communicate with each other.

11. The frame structure of claim 10, wherein the first reinforcing member comprises:
a rear portion blocking a vehicle rear side of the opening portion;
an intermediate portion connecting the front portion and the rear portion and defining the first space elongated in the transverse direction; and
a side portion connecting the front portion, the intermediate portion, and the rear portion and defining the second space elongated in the vertical direction together with the inner panel.

12. The frame structure of claim 11, wherein the front end of the rear suspension arm can be inserted between the outer panel and the side portion of the first reinforcing member, and wherein the rear suspension arm can be rotatably supported by a fastening bolt that sequentially penetrates the outer panel, the rear suspension arm, and the side portion.

13. The frame structure of claim 12, wherein a nut is fixed by the side portion and the inner panel, and the fastening bolt can sequentially penetrate the outer panel, the rear suspension arm, and the side portion and fastened to the nut.

\* \* \* \* \*